(12) United States Patent
Schmitt

(10) Patent No.: US 6,494,379 B1
(45) Date of Patent: Dec. 17, 2002

(54) METHOD AND ARRANGEMENT HAVING A DATA CARRIER

(75) Inventor: Hans-Walter Schmitt, Bloomfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/363,644

(22) Filed: Jul. 30, 1999

Related U.S. Application Data

(63) Continuation of application No. 08/867,668, filed on Jun. 2, 1997, now abandoned.

(30) Foreign Application Priority Data

May 31, 1996 (DE) .......................................... 196 21 901

(51) Int. Cl.⁷ ............................................ G06K 13/107
(52) U.S. Cl. ........................................ 235/487; 701/65
(58) Field of Search ............................. 235/478, 472; 701/65

(56) References Cited

U.S. PATENT DOCUMENTS

| | | | | |
|---|---|---|---|---|
| 4,108,362 A | | 8/1978 | Trussell et al. .............. 235/375 |
| 4,176,260 A | * | 11/1979 | Ward et al. .................. 235/475 |
| 4,611,380 A | | 9/1986 | Abe et al. ...................... 29/430 |
| 4,700,309 A | | 10/1987 | Naito et al. .................. 364/468 |
| 4,791,284 A | | 12/1988 | Ludden ....................... 235/487 |
| 4,804,937 A | * | 2/1989 | Barbiaux et al. .............. 340/52 |
| 5,074,373 A | | 12/1991 | Schmidt ..................... 180/305 |
| 5,120,943 A | | 6/1992 | Benz .......................... 235/375 |
| 5,230,133 A | * | 7/1993 | Esposito ....................... 283/36 |
| 5,467,277 A | * | 11/1995 | Fujisawa et al. ........ 364/424.05 |
| 5,488,223 A | | 1/1996 | Austin et al. ................ 235/375 |
| 5,508,504 A | * | 4/1996 | Dvorkis ...................... 235/472 |
| 5,703,345 A | | 12/1997 | Gollner et al. .............. 235/384 |
| 5,711,712 A | * | 1/1998 | Graf ........................... 477/121 |
| 6,115,653 A | * | 9/2000 | Bergstrom et al. ............. 701/29 |
| 6,220,223 B1 | * | 4/2001 | Weisman, II et al. ........ 123/436 |
| 6,278,928 B1 | * | 8/2001 | Aruga et al. .................. 701/65 |

FOREIGN PATENT DOCUMENTS

| | | |
|---|---|---|
| DE | 3410675 | 10/1985 |
| DE | 4003954 | 6/1991 |
| JP | 02170016 | 6/1990 |
| JP | 8135454 | * 5/1996 |

* cited by examiner

*Primary Examiner*—Thien M. Le
*Assistant Examiner*—Allyson Sanders
(74) *Attorney, Agent, or Firm*—Walter Ottesen

(57) ABSTRACT

The invention is directed to an arrangement having a unit which exhibits specific mechanical characteristics to be detected, for example, via mechanical parameters. Furthermore, a data carrier for storing these characteristics is provided which is connected to the unit or is a part of the unit. The essence of the invention is that the data carrier is so configured that the characteristics are stored so that they are readable optically and/or mechanically and/or magnetically.

20 Claims, 1 Drawing Sheet

METHOD AND ARRANGEMENT HAVING A DATA CARRIER

This is a continuation of application Ser. No. 08/867,668, filed on Jun. 2, 1997 now abandoned.

BACKGROUND OF THE INVENTION

Combinations of mechanical equipment with electronic control units increasingly assume importance because often mechanical operations are controlled by electronic apparatus. One example of this is the electronic transmission control. For example, here, the control of hydraulic pressure responses has to take place with a very high precision in order to obtain an excellent quality of the transmission gear shift operations. Until now, this was solved in that a highly precise current controller, which is adapted to an absolute value, drives a mechanical pressure controller which is likewise precisely adapted. The pressure controller then would operate on one or more clutches of the transmission via hydraulic elements which are likewise adapted. All components were manufactured to the tightest tolerances possible and adapted because the tolerances of individual components can be cumulative.

Various solutions are known to adapt mechanical equipment to the electronic control apparatus.

For example, it is known to provide a fixed connection of the mechanical equipment and the electronic control apparatus (attachment or built-on apparatus, mechanical-electronic unit) so that, with an adaptation over the entire electrical-mechanical signal paths, the desired precision is obtained after assembly of the components. However, in this context, the following problems occur:

(a) The location of installation of the electronic control unit on the mechanical component (for example, on or in the vehicle transmission) presents very severe ambient conditions (temperature, acceleration) for the electronic circuits which makes the configuration of the control difficult and/or expensive.

(b) The exchange of electronic units requires a new adaptation which cannot, in most cases, be carried out in a simple manner.

Furthermore, German patent publication 3,410,675 discloses attaching an electronic memory to the mechanical component. The memory contains relevant mechanical parameters and is connected via electrical lines to the control so that the parameters can be transmitted to the control. Here, too, the problem is presented that the electronic memory must be suitable in some circumstances for extreme ambient conditions. Furthermore, an electrical connection between the memory and the control unit is necessary.

SUMMARY OF THE INVENTION

It is an object of the invention to provide a simple and cost-effective way to provide adaptation between the mechanical and electronic components.

The invention is for an arrangement for a unit having specific mechanical characteristics. The arrangement includes a data carrier on the unit which is adapted to store the mechanical characteristics. The data carrier is configured to permit the mechanical characteristics to be read in at least one of the following ways: optically, mechanically and magnetically.

As mentioned above, the invention proceeds from an arrangement having a unit which has specific mechanical characteristics which can be detected especially via mechanical parameters. Furthermore, a data carrier for storing these mechanical characteristics is provided and is connected to the unit or is a part of this unit.

The essence of the invention is that the data carrier is so configured that the characteristics are stored so that they can be readable in at least one of the following ways: optically, mechanically and magnetically.

The advantage compared to the above-mentioned fixed connection of the mechanical component and the electronic component is that the electronic component, which is generally sensitive, is built in so as to be separated and protected from the mechanical component. In this way, no problems are present with respect to ambient conditions. Furthermore, the invention affords a price advantage compared to the above-mentioned electronic memory on the mechanical component because the data carrier of the invention (especially in its optical configuration) is significantly more cost-effective than an electronic memory. Advantageously, the data carrier of the invention is relatively insensitive with respect to ambient influences so that the data stored therein can be reliably retained.

With the invention, a high flexibility with respect to the location of installation of the electronic component is ensured compared to the fixed association of the mechanical component to the electronic component (built-on apparatus). In addition, a simple new programming when exchanging one of the components is possible and relatively simple equipment is in most cases already available in service centers for motor vehicles.

In an advantageous embodiment, the invention provides that the unit can be controlled via a control unit during specific operation. Here, the control unit can have a memory unit such as a nonvolatile memory in which at least portions of the characteristics, which are stored in the data carrier, are read in.

The characteristics of the mechanical component are stored via a machine-readable character code on the data carrier in an advantageous embodiment of the invention. According to a more specific embodiment, the characteristics are stored on the data carrier with an optically readable sequence of contrast forming areas (the so-called bar code).

The characteristics can be read out or stored by the data carrier by means of a light source such as a laser.

The data carrier itself, or at least a portion of the data carrier, can be made up of a metal shield and/or a plastic shield. The data carrier can be connected to the unit via attachment means such as rivets, adhesive and/or threaded fasteners.

Alternatively, a portion of the mechanical unit can be directly labelled as data carrier. The above-mentioned attachment means are then not necessary in this case.

According to the invention, the unit is configured as a vehicle transmission and mechanical tolerances of the vehicle transmission (especially of a mechanical pressure controller and/or of hydraulic transmission elements) are stored on the data carrier. The control unit is then configured as a transmission control unit.

The invention is also directed to a method for adapting a control unit, which has a memory unit, to a unit which exhibits specific mechanical characteristics which can be detected especially via mechanical parameters. Here, the characteristics are stored on a data carrier defining a part of this unit or connected to this unit. The characteristics can be read optically and/or mechanically and/or magnetically. To adapt the control unit to the unit which exhibits the specific mechanical characteristics, these characteristics are read out and are especially read out optically whereupon these read-out characteristics are stored in the memory unit of the control unit.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
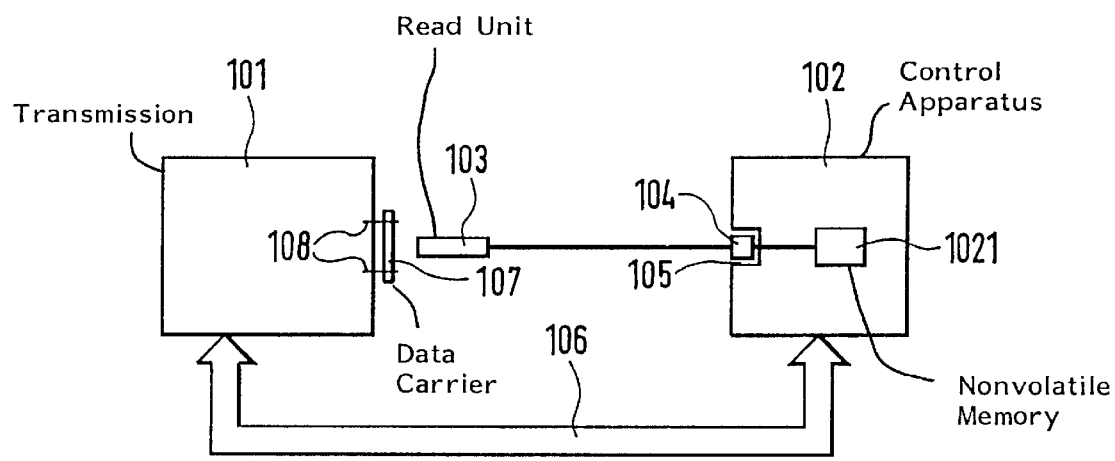
FIG. 1a is a schematic diagram of the arrangement according to the invention; and, FIG. 1b is a plan view of the transmission on which the data carrier is mounted.

Referring to FIG. 1a, reference numeral 101 identifies a mechanical component in the form of a transmission of a motor vehicle. The data carrier 107 is attached to the transmission via fastening means 108. During operation, the vehicle transmission 101 is connected to the control unit 102 via the electrical lines 106. The vehicle transmission 101 is driven via the electrical lines 106 by the control unit 102 for adjusting specific transmission gear ratios. The control unit 102 can receive data from the transmission 101 for optimizing the drive.

In addition, a read unit 103 is shown in FIG. 1a which is connected to the control unit 102 (that is, the nonvolatile memory 1021) via the plug and socket connection (104, 105).

Figure 1B:
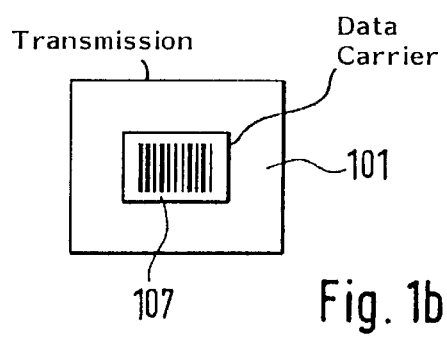

FIG. 1b shows a plan view of the transmission 101 having the data carrier 107.

According to this embodiment, the measured mechanical parameters of the transmission 101 (which are needed for the adaption of the electronic control unit 102 to the transmission 101) are mounted in the form of a machine-readable character code, such as a bar code, externally on the mechanical component 101. This machine-readable character code is imprinted or impressed on the data carrier 107. The data carrier 107 can, for example, be a metal or plastic plate which is attached utilizing rivets, threaded fasteners or adhesive (attachment means 108) to the mechanical component 101. The labelling of the data carrier can be performed automatically via a laser. Another possibility is the direct labelling of the mechanical component 101. In this case, the attachment means 108 are not needed. In this solution also, a laser labelling can be advantageously used. FIG. 1b shows schematically such a machine-readable bar code.

The data of the code readable on the data carrier 107, that is, the relevant mechanical parameters, can be read by a read unit 103 for machine-readable codes (such as by a conventional bar code reader) when the mechanical component 101 and the electronic component 102 are assembled to a total system, for example, at the end of a manufacturing assembly line. These data are then transmitted via an electronic interface (104, 105) to a write-nonvolatile electronic memory 1021 in the control unit 102. The memory can, for example, be an EPROM or a flash-EPROM.

If the invention is used in a motor vehicle for an electronic transmission control or another electronic component, then the data can be read in via an already-available diagnostic interface at the control unit 102.

In addition to the application for transmission control arrangements, the invention is also suitable for adapting engine control apparatus to the motor of the vehicle and/or to additional ancillary devices (for example, injection pumps).

It is understood that the foregoing description is that of the preferred embodiments of the invention and that various changes and modifications may be made thereto without departing from the spirit and scope of the invention as defined in the appended claims.

What is claimed is:

1. An arrangement for adapting a control unit of a motor vehicle to a transmission having specific mechanical tolerances measured for said transmission, the arrangement comprising:

a data carrier on said transmission being adapted to store said mechanical tolerances and said data carrier being configured so as to permit said mechanical characteristics to be read in in at least one of the following ways: optically, mechanically and magnetically;

said control unit being connected to said transmission for controlling said transmission during operation thereof;

a memory contained in said control unit;

means for reading into said memory at least a portion of said mechanical tolerances of said transmission to adapt said control unit to said transmission for the normal operation of said transmission with said control unit during the operation of said vehicle; and, said control unit being configured as a transmission control unit.

2. The arrangement of claim 1, said data carrier being connected to said transmission so as to be mounted thereon.

3. The arrangement of claim 1, said data carrier being formed so as to be an integral part of said transmission.

4. The arrangement of claim 1, said mechanical characteristics being stored on said data carrier as a machine-readable character code.

5. The arrangement of claim 1, said memory being a nonvolatile memory.

6. The arrangement of claim 4, said character code being an optically readable bar code.

7. The arrangement of claim 6, said reading means including a light source for reading said bar code.

8. The arrangement of claim 7, said light source being a laser.

9. The arrangement of claim 4, wherein at least a portion of said data carrier is a shield or plate made of plastic or metal.

10. The arrangement of claim 1, further comprising attachment means for attaching said data carrier to said transmission.

11. The arrangement of claim 10, said attachment means including rivets, adhesive or threaded fasteners for securing said data carrier to said transmission.

12. The arrangement of claim 1, said data carrier being a characteristic code formed directly on said transmission.

13. The arrangement of claim 1, said transmission including: a mechanical pressure controller and hydraulic transmission elements; and, said mechanical tolerances being of at least one of said mechanical pressure controller and said hydraulic transmission elements.

14. A method for adapting a control apparatus of a motor vehicle to a transmission of said motor vehicle and said transmission having specific mechanical tolerances and said control apparatus having a memory, the method comprising the steps of:

measuring said specific mechanical tolerances of said transmission;

storing said mechanical tolerances specific to said transmission on a data carrier so as to be readable in at least one of the following ways: optically, mechanically and magnetically;

connecting said control apparatus to said transmission for controlling said transmission during operation thereof;

reading out said mechanical tolerances to adapt said control apparatus to said transmission; and, storing the read out mechanical tolerances in said memory.

15. The method of claim 14, wherein said mechanical characteristics are read out optically.

16. An arrangement for adapting a control unit of a motor vehicle to an additional unit of said motor vehicle and said additional unit having specific mechanical tolerances, the arrangement comprising:

a data carrier mounted on said additional unit and being adapted to store said mechanical tolerances and said data carrier being configured so as to permit said mechanical tolerances to be read in at least one of the following ways: optically, mechanically and magnetically;

said control unit being connected to said additional unit for controlling said additional unit during operation thereof and of said motor vehicle;

a memory contained in said control unit;

means for reading into said memory at least a portion of said mechanical tolerances specific to said additional unit to adapt said control unit to said additional unit; and, said control unit being configured to control said additional unit.

17. The arrangement of claim 16, wherein said vehicle has a motor and additional ancillary devices including an injection pump; and, wherein said component is any one of the following: said motor of said vehicle and said additional ancillary devices including said injection pump.

18. A method for adapting a control apparatus of a motor vehicle to a component of said vehicle and said component having specific mechanical tolerances which can be measured and said control apparatus having a memory, the method comprising the steps of:

measuring said mechanical tolerances specific to said component;

storing said mechanical tolerances on a data carrier so as to be readable in at least one of the following ways: optically, mechanically and magnetically;

connecting said control apparatus to said component for controlling said component during operation thereof in said motor vehicle;

reading out said mechanical tolerances from said data carrier to adapt said control apparatus to said component; and, storing the read out mechanical characteristics in said memory of said control apparatus.

19. The method of claim 18, wherein said vehicle has a motor and additional ancillary devices including an injection pump; and, wherein said component is any one of the following: said motor of said vehicle and said additional ancillary devices including said injection pump.

20. An arrangement for adapting a control unit of a motor vehicle to a transmission having specific mechanical tolerances measured for said transmission, the arrangement comprising:

a non-electronic data carrier fixedly arranged on said transmission and said data carrier being adapted to store said mechanical tolerances of said transmission and said data carrier being configured so as to permit said mechanical characteristics to be read in optically or magnetically;

said control unit being electrically connected to said transmission with electrical lines for controlling said transmission during operation thereof;

a memory contained in said control unit;

means for reading into said memory at least a portion of said mechanical tolerances of said transmission to adapt said control unit to said transmission for the normal operation of said transmission with said control unit during the operation of said vehicle; and, said control unit being configured as a transmission control unit.

* * * * *